(12) United States Patent　(10) Patent No.: US 8,055,803 B1
Issa et al.　(45) Date of Patent: Nov. 8, 2011

(54) GENERATING COMMUNITIES USING A MEDIATING SERVER AND THE SEMANTIC WEB

(75) Inventors: Alfredo C. Issa, Apex, NC (US); Richard J. Walsh, Raleigh, NC (US); James Evans, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1378 days.

(21) Appl. No.: 11/471,835

(22) Filed: Jun. 21, 2006

(51) Int. Cl.
  *G06F 15/16* (2006.01)
(52) U.S. Cl. ........ 709/253; 709/223; 709/230; 709/226; 726/10
(58) Field of Classification Search .................. 709/223, 709/226, 230; 726/10
  See application file for complete search history.

(56) References Cited

U.S. PATENT DOCUMENTS

| | | | |
|---|---|---|---|
| 6,721,282 B2 | 4/2004 | Motley | |
| 6,865,605 B1 * | 3/2005 | Soderberg et al. | 709/226 |
| 6,970,848 B2 * | 11/2005 | Osaka et al. | 705/51 |
| 6,987,985 B2 | 1/2006 | Purkayastha et al. | |
| 7,016,668 B2 | 3/2006 | Vaidyanathan et al. | |
| 7,039,562 B1 * | 5/2006 | Notani et al. | 703/1 |
| 7,149,807 B1 * | 12/2006 | Kontothanassis | 709/230 |
| 7,376,790 B2 * | 5/2008 | Lango et al. | 711/126 |
| 7,512,973 B1 * | 3/2009 | Chan et al. | 726/10 |
| 2002/0010759 A1 | 1/2002 | Hitson et al. | |
| 2002/0013812 A1 | 1/2002 | Krueger et al. | |
| 2002/0054578 A1 | 5/2002 | Zhang et al. | |
| 2002/0061029 A1 | 5/2002 | Dillon | |
| 2002/0104099 A1 | 8/2002 | Novak | |
| 2002/0129367 A1 | 9/2002 | Devara | |
| 2002/0144267 A1 | 10/2002 | Gutta et al. | |
| 2002/0156842 A1 | 10/2002 | Signes et al. | |
| 2003/0050055 A1 | 3/2003 | Ting et al. | |
| 2003/0081580 A1 | 5/2003 | Vaidyanathan et al. | |
| 2003/0152096 A1 | 8/2003 | Chapman | |
| 2003/0161268 A1 | 8/2003 | Larsson et al. | |
| 2004/0030798 A1 | 2/2004 | Anderson et al. | |
| 2004/0042421 A1 | 3/2004 | Mahany | |
| 2004/0117824 A1 | 6/2004 | Karaoguz et al. | |

(Continued)

FOREIGN PATENT DOCUMENTS

GB　2 306 869 A　11/1995

OTHER PUBLICATIONS

PC Magazine, http://www.pcmag.com/article2/0,1759,1619375,00.asp.

(Continued)

*Primary Examiner* — Tammy Nguyen

(74) *Attorney, Agent, or Firm* — Withrow & Terranova, PLLC

(57) ABSTRACT

A system and method are provided for creating communities based on a semantic understanding of content requested by a number of user devices. More specifically, a mediating server operates to interconnect a number of user devices to destination servers. In operation, the mediating server routes requests from the user devices to the appropriate destination servers. The mediating server examines the responses from the destination servers to gain a semantic understanding of the content requested by the user devices. Thereafter, the mediating server establishes communities for the user devices based on the semantic understanding of the content requested by the user devices. For example, the mediating server may invite users of the user devices that have requested semantically similar content to join a chat session around a common topic.

19 Claims, 4 Drawing Sheets

U.S. PATENT DOCUMENTS

| | | | |
|---|---|---|---|
| 2004/0248615 A1 | 12/2004 | Purkayastha et al. | |
| 2004/0264372 A1 | 12/2004 | Huang | |
| 2004/0267900 A1* | 12/2004 | Hoekstra et al. | 709/217 |
| 2005/0008017 A1 | 1/2005 | Datta et al. | |
| 2005/0034001 A1 | 2/2005 | Pontarelli | |
| 2005/0108769 A1 | 5/2005 | Arnold et al. | |
| 2005/0120127 A1 | 6/2005 | Bradley et al. | |
| 2005/0165828 A1* | 7/2005 | Lango et al. | 707/102 |
| 2005/0169632 A1 | 8/2005 | Song et al. | |
| 2005/0183120 A1 | 8/2005 | Jain et al. | |
| 2005/0192987 A1 | 9/2005 | Marsh | |
| 2005/0201340 A1 | 9/2005 | Wang et al. | |
| 2005/0216942 A1 | 9/2005 | Barton | |
| 2005/0239497 A1 | 10/2005 | Bahl et al. | |
| 2005/0286438 A1 | 12/2005 | Rajkotia | |
| 2006/0048185 A1 | 3/2006 | Alterman | |
| 2006/0048186 A1 | 3/2006 | Alterman | |
| 2006/0053452 A1 | 3/2006 | Lee et al. | |
| 2006/0056349 A1 | 3/2006 | Nakatugawa et al. | |
| 2006/0085830 A1 | 4/2006 | Bruck et al. | |
| 2006/0129672 A1 | 6/2006 | Mayer | |
| 2006/0206933 A1 | 9/2006 | Molen et al. | |
| 2007/0002742 A1 | 1/2007 | Krishnaswamy et al. | |
| 2007/0061488 A1 | 3/2007 | Alagappan et al. | |
| 2007/0061580 A1 | 3/2007 | Venkatesan et al. | |

OTHER PUBLICATIONS

Yahoo! Messenger, http://messenger.yahoo.com/chat.php.

Eric Setton et al., "Cross-Layer Design of Ad Hoc Networks for Real-Time Video Streaming," (article), Aug. 2005, pp. 99-102, vol. 12, issue 4, IEEE Wireless Communications.

No Author, "PC Connection," (website), 2006, 2 pages, http://www.pcconnection.com/ProductDetail?sku=5373172&SourceID=k40132.

Vijay T. Raisinghani et al., "ECLAIR: An Efficient Cross Layer Architecture for Wireless Protocol Stacks," (article), May 25-28, 2004, 6 pages, 5th World Wireless Congress, San Francisco, CA.

Vineet Srivastava et al., "Cross-Layer Design: A Survey and the Road Ahead," (article), Dec. 2005, pp. 112-119, IEEE Communications Magazine.

* cited by examiner

GENERATING COMMUNITIES USING A MEDIATING SERVER AND THE SEMANTIC WEB

FIELD OF THE INVENTION

The present invention relates to a mediating server and more specifically relates to a mediating server that generates communities based on a semantic understanding of requested content.

BACKGROUND OF THE INVENTION

Internet users often search for web forums or chat groups related to topics of interest to the users. However, the users must actively search for such communities. Thus, there is a need for a system and method for establishing communities of users that do not require the users to actively search for the communities.

SUMMARY OF THE INVENTION

The present invention provides a system and method for creating communities based on a semantic understanding of content requested by a number of user devices. More specifically, a mediating server located at an intermediary network node operates to interconnect a number of user devices to destination servers. In operation, the mediating server receives requests from the user devices and routes the requests to the appropriate destination servers. The mediating server examines the responses from the destination servers to gain a semantic understanding of the content requested by the user devices. In addition, the mediating server may examine the requests to gain further semantic understanding of the content requested by the user devices. Thereafter, the mediating server establishes communities of the user devices based on the semantic understanding of the content requested by the user devices. For example, the mediating server may invite users of the user devices that have requested semantically similar content to join a chat group around a common topic.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
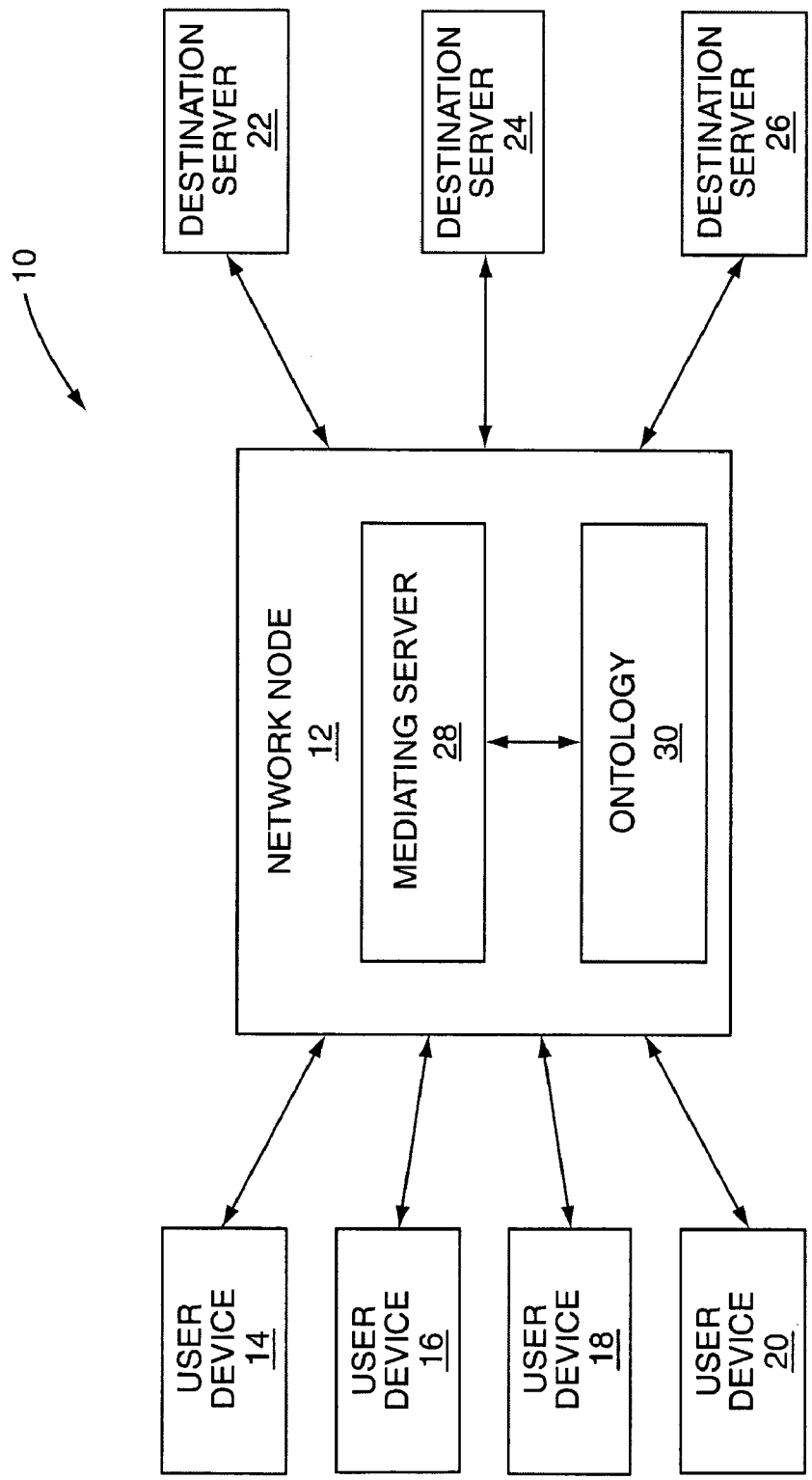
FIG. 1 illustrates a system including a mediating server operating to establish communities of user devices based on a semantic understanding of requested content according to one embodiment of the present invention.

FIG. 1 illustrates a system 10 implementing one embodiment of the present invention. The system 10 includes an intermediary network node 12, hereafter referred to as the network node 12, interconnecting a number of user devices 14-20 and a number of destination servers 22-26. Note that while four user devices 14-20 and three destination servers 22-26 are illustrated, the system 10 may include any number of user devices and destination servers. Further, while not illustrated, one of ordinary skill in the art will appreciate that one or more additional network nodes may interconnect the user devices 14-20 to the network node 12 and, likewise, one or more additional network nodes may interconnect the network node 12 to the destination servers 22-26.

Figure 2:
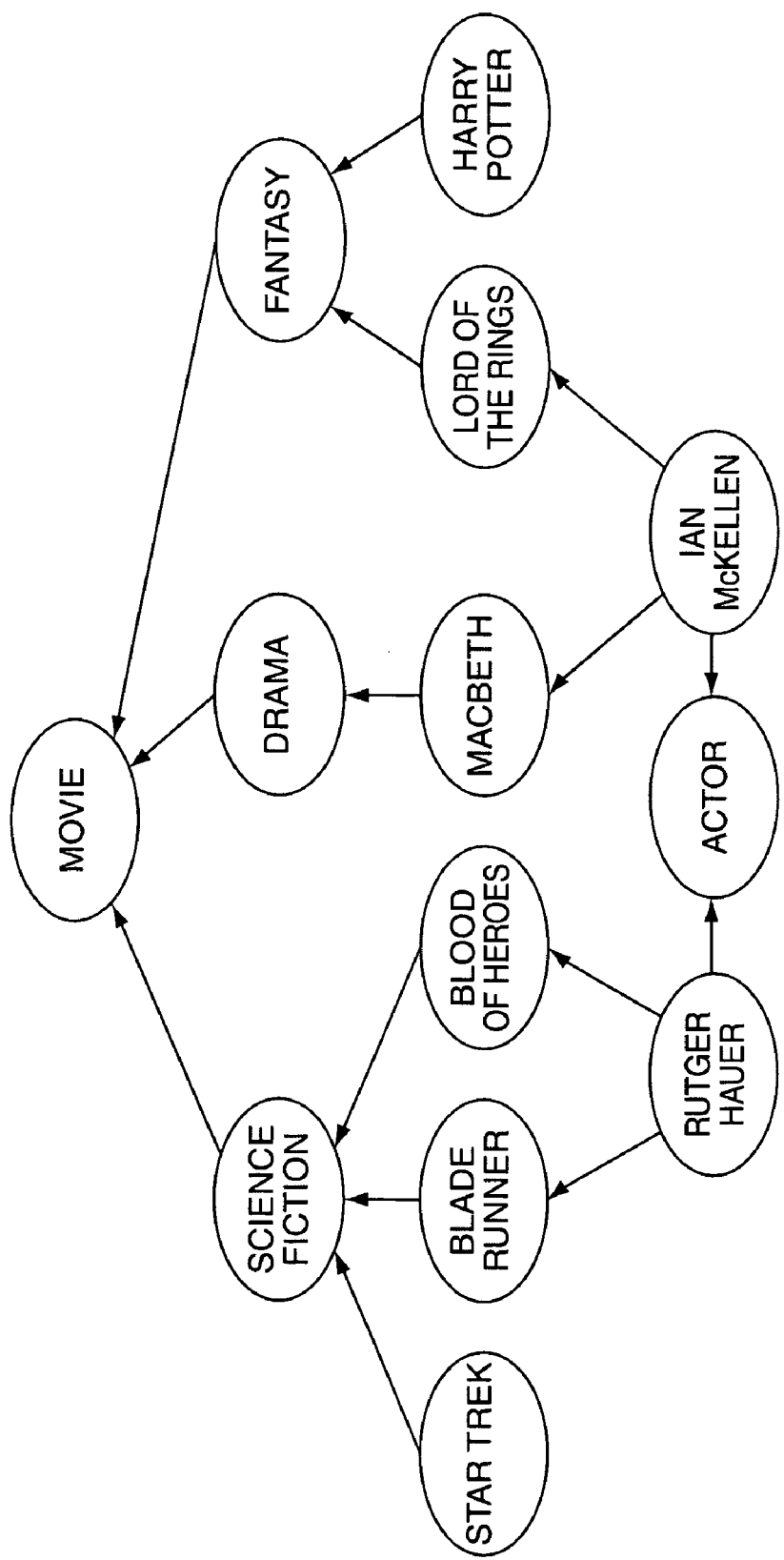
FIG. 2 illustrates an exemplary ontology for identifying semantically related topics according to one embodiment of the present invention.

The network node 12 may be a mediating server associated with an Internet Service Provider (ISP), a corporate firewall, a Local Area Network (LAN) access point, or the like. According to the present invention, the network node 12 includes a mediating server 28 and an ontology 30. Alternatively, the ontology 30 may be hosted by a remote server. Also, the mediating server 28 may alternatively be implemented as a number of distributed mediating proxies that collaboratively operate as the mediating server 28 described herein. For example, a load balancing technique may be used where a request may be routed through a first mediating server and the corresponding response may be routed through a second mediating server. The two mediating servers may then collaboratively operate at the mediating server 28 described herein. The mediating server 28 may be implemented in software, hardware, or a combination thereof. As discussed below, the mediating server 28 gains semantic understanding of content accessed by the user devices 14-20 and facilitates the formation of communities based on semantic similarities of the content accessed by the user devices 14-20. The communities may be hosted by the mediating server 28, the network node 12, or some other network node. The ontology 30 is generally a data model that represents a domain that is used to gain a semantic understanding about the objects in that domain and the relations between them. An exemplary ontology or portion of an ontology is illustrated in FIG. 2. As discussed below, the mediating server 28 uses the ontology 30 to identify semantically related topics.

Figure 3:
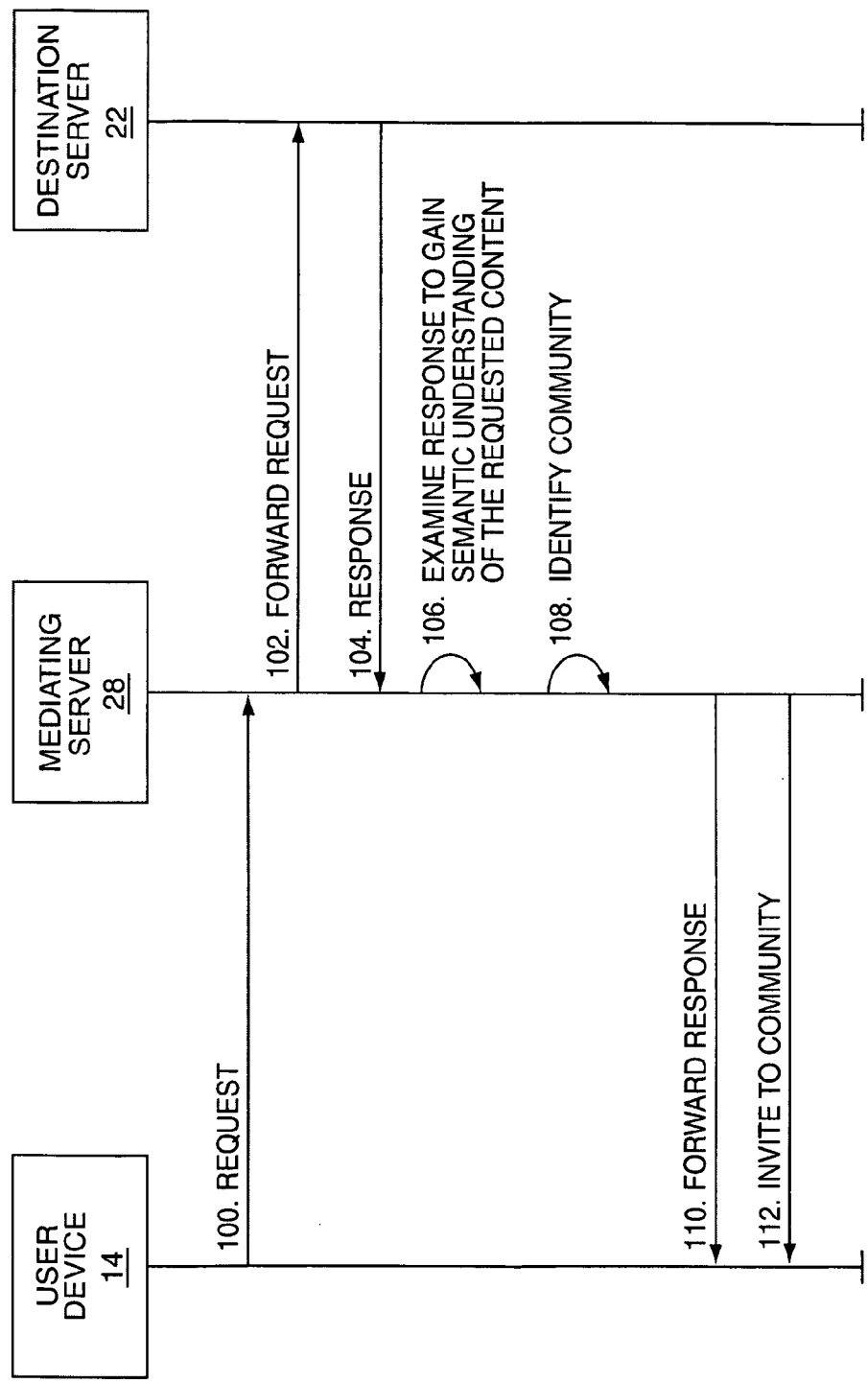
FIG. 3 illustrates the operation of the system of FIG. 1 according to one embodiment of the present invention.

FIG. 3 illustrates the operation of the mediating server 28 according to one embodiment of the present invention. In this example, the mediating server 28 routes a request from the user device 14 to the destination server 22 and a corresponding response from the destination server 22 to the user device 14. First, the user device 14 sends a request for desired content to the mediating server 28 (step 100). The desired content may be a web page; a media file such as, but not limited to, an image file or a video file; streaming media content such as, but not limited to, streaming video content; or the like. The mediating server 28 maintains an internal table of all active outbound requests where the table identifies the user devices 14-20 making the requests. Upon receiving the request from the user device 14, the mediating server 28 forwards the request to the appropriate destination server, which in this example is the destination server 22 (step 102).

The destination server 22 then provides a response including the requested content to the mediating server 28 (step 104). In one embodiment, the response may also include semantic metadata. The semantic metadata may be, for example, metadata provided according to the Resource Description Framework (RDF) model semantically describing the requested content. Information describing the family of specifications for RDF can be found at http://www.w3.org/RDF/. An exemplary RDF semantic metadata structure describing an article about Fidel Castro is:

```
<rdf:RDF
    xmlns:rdf=http://www.w3.org/1999/02/22-rdf-syntax-ns#
    xmlns:dc="http://purl.org/dc/elements/1.1/">
<rdf:Description rdf:about="http://en.wikipedia.org/wiki/Fidel_Castro ">
    <dc:title>Fidel Castro</dc:title>
    <dc:publisher>Wikipedia</dc:publisher>
</rdf:Description>
</rdf:RDF>
```

Other examples of semantic metadata include, but are not limited to, keywords, annotations, location information, or the like within the headers of or associated with a media file, streaming media content, or the like. In addition, the semantic metadata may include a reference to external content or information.

The mediating server 28 then examines the response from the destination server 22 to gain a semantic understanding of the requested content (step 106). In one embodiment, the response includes semantic metadata giving semantic meaning to the requested content. The mediating server 28 may gain further semantic understanding of the requested content by mapping keywords from the semantic metadata to one or more nodes in the ontology 30. In addition, the mediating server 28 may gain further semantic understanding by examining the request. For example, the mediating server 28 may examine a Uniform Resources Locator (URL) and any parameters, such as parameters for a Hypertext Transfer Protocol (HTTP) GET request, of the request to gain semantic understanding of the requested content.

In another embodiment, the mediating server 28 extracts the content from the response using a screen scraping function. Note that different screen scraping functions may be used for different types of content such as, but not limited to, Hypertext Markup Language (HTML) files, Microsoft Word documents, Adobe Acrobat PDF files, PowerPoint presentations, and the like. Further, different screen scraping functions may be included for different types of web sites. As an example, screen scraping may be used to extract the text of a web page from a corresponding HTML file. By extracting the text from the web page, the mediating server 28 ensures that HTML tags that repeatedly occur in the HTML file are not interpreted as keywords regarding the semantic meaning of the web page. Once the content is extracted from the response, the mediating server 28 uses an inference engine, such as a natural language inference engine, to gain semantic understanding of the requested content, which is referred to herein as the semantic meaning of the requested content. For example, the inference engine may determine one or more of the most commonly used keywords or phrases in the text of a web page other than common words such as, for example, "the," "a," "an," and the like. As another example, screen scraping may be used to extract text from streaming video content. For example, streaming video content may include scrolling text messages, and screen scraping, or a similar technique, may be used to extract the text messages from the video.

Based on the semantic meaning of the requested content, the mediating server 28 identifies a community for the user device 14 (step 108). The community may be one of a number of existing communities previously established by the mediating server or a new community. The community may be, for example, a chat group among users of user devices 14-20 having requested semantically similar content, a peer-to-peer (P2P) file sharing community among user devices 14-20 having requested semantically similar content, an e-mail list or forum associated with a particular topic related to the semantic meaning of the request content, or the like.

In order to identify a community for the user device 14, the mediating server 28 first determines whether there is an existing community for a topic related to or equivalent to the semantic meaning of the requested content. The mediating server 28 may identify topics related to the semantic meaning of the requested content using the ontology 30. For example, the requested content may be a web page discussing Ian McKellen. By examining the response passing through the mediating server 28, the mediating server 28 determines that the semantic meaning of the requested content is "Ian McKellen." If there are no communities around the topic "Ian McKellen," the mediating server 28 may query the ontology 30, thereby determining that the topic "Ian McKellen" is semantically related to the topics "Lord of the Rings" and "Fantasy." If there is an existing community around the topic "Fantasy," the mediating server 28 may identify the community around the topic "Fantasy" as the community to which to invite the user of the user device 14.

If there are no existing communities around topics related to or equivalent to the semantic meaning of the requested content, the mediating server 28 may then determine whether there is another active request for content that is semantically similar to, or related to, the content requested by the user device 14. For example, the user device 14 may request a streaming video related to "Ian McKellen" and the user device 16 may request a web page related to "Harry Potter." Using the ontology 30, the mediating server 28 may determine that both of these topics are related to the topic "Fantasy." As such, the mediating server 28 may identify a new community around the topic "Fantasy" and, as discussed below, invite the users of the user devices 14 and 16 to join the community.

If there are no existing communities and no other active requests around topics related to or equivalent to the semantic meaning of the requested content, the mediating server 28 may start a new community, where the user of the user device 14 waits for additional users to join the community.

It should be noted that the mediating server 28 may also manage the size of the communities. For example, the mediating server 28 may limit the number of users for each community and create multiple communities around the same topic if desired. The mediating server 28 may additionally or alternatively create narrow or broad topics for communities based on user density around the topic. For example, if there are a large number of users requesting content related to the "Fantasy" topic, the mediating server 28 may create communities around related sub-topics such as "Lord of the Rings," "Harry Potter," and "Ian McKellen." In contrast, if the number of users requesting content related to the "Fantasy" topic is small, the mediating server 28 may create a single community around the topic "Fantasy."

Once the community is identified, the mediating server 28 forwards the response from the destination server 22 to the user device 14 (step 110) and invites the user to join the identified community (step 112). While in this example the response is not forwarded to the user device 14 until after steps 106 and 108, the response may alternatively be forwarded to the user device 14 prior to steps 106 and 108 or simultaneously therewith. The invitation to join the community may be provided, for example, by framing the content from the destination server 22 with an invitation to join the community or modifying the response to add a JavaScript pop-up message inviting the user in join the community. The invitation may alternatively be provided by an end-user agent application that receives the invitation message from the mediating server 28 and generates a user interface message that invites the user of the user device 14 to join the community.

Figure 4:
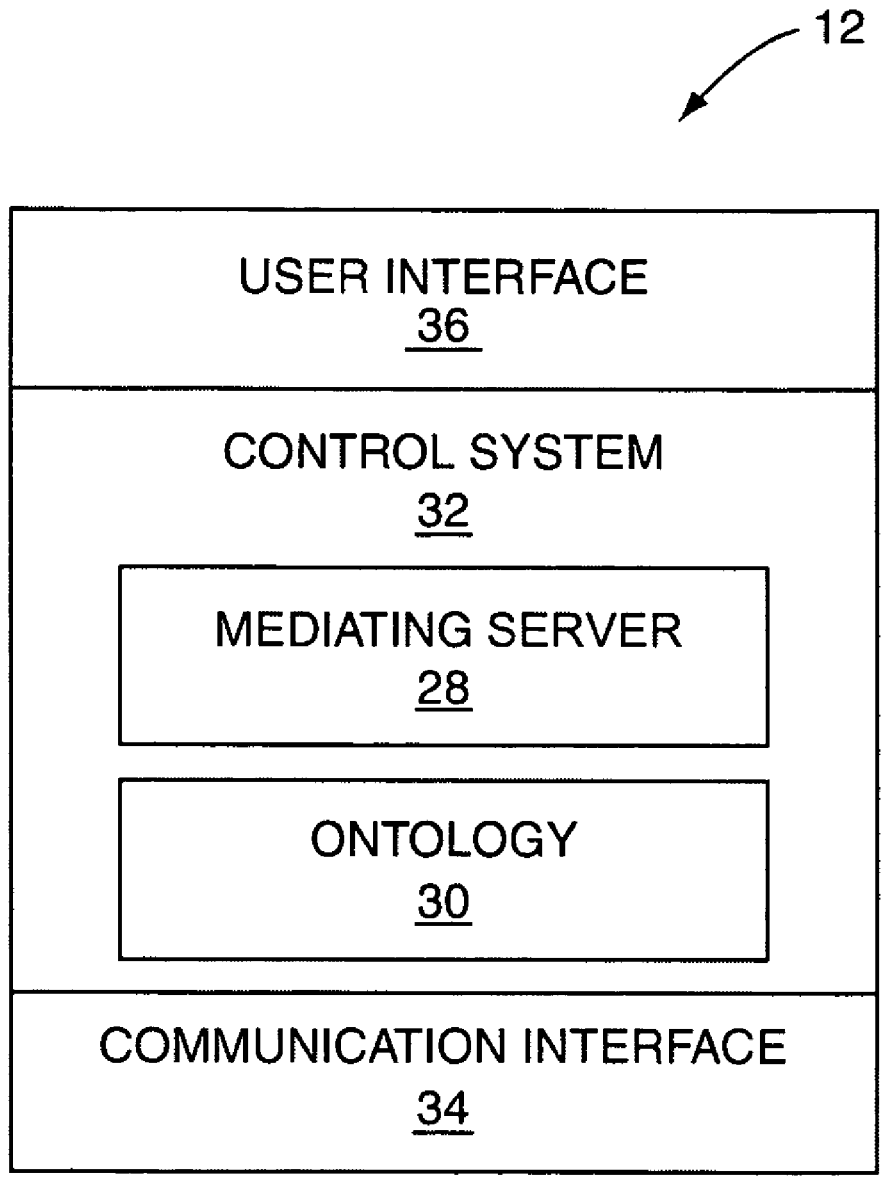
FIG. 4 is a block diagram of the intermediary network node hosting the mediating server according to one embodiment of the present invention.

FIG. 4 is a block diagram of the intermediary network node 12 according to one embodiment of the present invention. In general, the intermediary network node 12 includes a control system 32; a communication, or network, interface 34; and a user interface 36. The control system 32 may be implemented in hardware, software, or a combination of hardware and software. For example, the control system 32 may be a central processing unit having associated memory storing software instructing the control system 32 to operate according to the present invention, one or more Application Specific Integrated Circuits (ASICs), one or more Digital Signal Processors (DSPs), or the like. The control system 32 includes the mediating server 28, which may be implemented in hardware, software, or a combination of hardware and software. In this example, the control system 32 also includes the ontology 30, which may be stored in associated memory. Alternatively, the ontology 30 may be stored by a remote server. The communication interface 34 communicatively couples the network node 12 to the user devices 14-20 either directly via wired or wireless communication links or indirectly via one or more additional network nodes. Likewise, the network node 12 communicatively couples the network node 12 to the destination servers 22-26 either directly via wired or wireless communication links or indirectly via one or more additional network nodes. The network node 12 may also include the user interface 36.

Those skilled in the art will recognize improvements and modifications to the preferred embodiments of the present invention. All such improvements and modifications are considered within the scope of the concepts disclosed herein and the claims that follow.

What is claimed is:

1. An intermediary network node comprising:
   a communication interface communicatively coupling the intermediary network node to a plurality of user devices and a plurality of destination servers; and
   a control system adapted to:
      receive a request for content from one of the plurality of user devices;
      forward the request to an associated one of the plurality of destination servers;
      receive a response including the requested content from the associated one of the plurality of destination servers;
      examine the response using a screen scraping function to gain a semantic understanding of the requested content;
      process the results of the screen scraping function using an inference engine to determine the semantic meaning of the results;
      identify a community for the one of the plurality of user devices based on the semantic meaning of the requested content; and
      forward the response to the one of the plurality of user devices.

2. The intermediary network node of claim 1 wherein the response comprises semantic metadata and the control system is further adapted to examine the response to obtain the semantic metadata to gain a semantic understanding of the requested content.

3. The intermediary network node of claim 2 wherein the semantic metadata is Resource Description Framework (RDF) metadata.

4. The intermediary network node of claim 2 wherein the semantic metadata comprises at least one of a group consisting of: keywords, annotations, and location information associated with the requested content.

5. The intermediary network node of claim 1 wherein the inference engine is a natural language inference engine adapted to process the results of the screen scraping function to determine the semantic meaning of the results.

6. The intermediary network node of claim 1 wherein the requested content is a web page and the control system is further adapted to extract at least one frequently used keyword from a text portion of the web page, the at least one frequently used keyword providing a semantic meaning of the web page.

7. The intermediary network node of claim 1 wherein the community is one of a group consisting of: a chat group around a topic related to the requested content, a peer-to-peer file sharing network, a forum around a topic related to the requested content, and an e-mail mailing list associated with a topic related to the requested content.

8. The intermediary network node of claim 1 wherein the control system is further adapted to:
   invite a user of the one of the plurality of user devices to join the identified community.

9. The intermediary network node of claim 1 wherein the control system is further adapted to:
   identify a second user device having requested content semantically similar to the requested content; and
   invite users of the one of the plurality of user devices and the second user device to join a community.

10. The intermediary network node of claim 1 wherein the requested content is one of a group consisting of a web page, a media file, and streaming media content.

11. The intermediary network node of claim 1 wherein the control system is further adapted to examine the request to gain further semantic understanding of the requested content.

12. A method comprising:
   receiving a request for content from one of a plurality of user devices;
   forwarding the request to an associated one of a plurality of destination servers;
   receiving a response including the requested content from the associated one of the plurality of destination servers;
   examining the response using a screen scraping function to gain a semantic understanding of the requested content;
   processing the results of the screen scraping function using an inference engine to determine the semantic meaning of the results;
   identifying a community for the one of the plurality of user devices based on the semantic meaning of the requested content; and
   forwarding the response to the one of the plurality of user devices.

13. The method of claim 12 wherein the response comprises semantic metadata and examining the response comprising obtaining the semantic metadata from the response to gain a semantic understanding of the requested content.

14. The method of claim 12 wherein processing the results of the screen scraping function using an inference engine further comprises processing the results of the screen scraping function using a natural language inference engine to determine the semantic meaning of the results.

15. The method of claim 12 wherein the requested content is a web page and examining the response comprises extracting at least one frequently used keyword from a text portion of the web page, the at least one frequently used keyword providing a semantic meaning of the web page.

16. The method of claim 12 the method further comprises:
inviting a user of the one of the plurality of user devices to join the identified community.

17. The method of claim 12 further comprising:
identifying a second user device having requested content semantically similar to the requested content; and
inviting users of the one of the plurality of user devices and the second user device to join a community.

18. An intermediary network node comprising:
a communication interface communicatively coupling the intermediary network node to a plurality of user devices and a plurality of destination servers; and
a control system adapted to:
receive a request for content from one of the plurality of user devices;
forward the request to an associated one of the plurality of destination servers;
receive a response including the requested content from the associated one of the plurality of destination servers;
examine the response using a screen scraping function to gain a semantic understanding of the requested content;
process the results of the screen scraping function using an inference engine to determine the semantic meaning of the results;
identify one of a plurality of communities associated with a topic related to the requested content based on the semantic meaning of the requested content, wherein the plurality of communities each associated with a particular topic have been previously established; and
forward the response to the one of the plurality of user devices.

19. The intermediary network node of claim 18 wherein the control system is further adapted to identify the topic related to the requested content using an ontology.

* * * * *